United States Patent [19]

Linstid, III

[11] Patent Number: 5,616,680

[45] Date of Patent: Apr. 1, 1997

[54] PROCESS FOR PRODUCING LIQUID CRYSTAL POLYMER

[75] Inventor: H. Clay Linstid, III, Clinton, N.J.

[73] Assignee: Hoechst Celanese Corporation, Somerville, N.J.

[21] Appl. No.: 563,910

[22] Filed: Nov. 22, 1995

Related U.S. Application Data

[63] Continuation of Ser. No. 462,479, Jun. 5, 1995, abandoned, which is a continuation-in-part of Ser. No. 317,961, Oct. 4, 1994, abandoned.

[51] Int. Cl.$^6$ .................................................. C08G 63/00

[52] U.S. Cl. .................. 528/183; 528/176; 528/185; 528/190; 528/194; 528/206; 528/219; 528/272; 528/275; 528/288; 528/298; 528/302; 528/308; 528/308.6; 524/779

[58] Field of Search .................... 528/176, 183, 528/185, 190, 194, 206, 219, 272, 275, 288, 298, 302, 308, 308.6; 524/779

[56] References Cited

U.S. PATENT DOCUMENTS

| | | | |
|---|---|---|---|
| 2,956,691 | 10/1960 | Kibler et al. | 414/541 |
| 3,245,956 | 4/1966 | Hunter | 528/65 |
| 3,542,709 | 11/1970 | Kazama et al. | 524/751 |
| 4,020,216 | 4/1977 | Miller | 428/425 |
| 4,024,317 | 6/1977 | Stoyle et al. | 428/423 |
| 4,067,852 | 1/1978 | Calundann | 528/190 |
| 4,284,750 | 8/1981 | Amirakis | 528/79 |
| 4,414,365 | 11/1983 | Sugimoto et al. | 525/437 |
| 4,473,682 | 9/1984 | Calundann et al. | 524/605 |
| 4,522,974 | 6/1985 | Calundann et al. | 524/605 |
| 4,746,694 | 5/1988 | Charbonneau et al. | 524/602 |

FOREIGN PATENT DOCUMENTS

| | | |
|---|---|---|
| 1917331 | 10/1969 | Germany . |
| 63139909 | 12/1986 | Japan . |
| 5-255495 | 10/1993 | Japan . |

OTHER PUBLICATIONS

Chemical Abstracts vol. 9, No. 22, Nov. 28, 1988 p. 50, Abstract No. 191546J.

DE 1917331 is equivalent to U.S. 3,543,709.

*Primary Examiner*—Samuel A. Acquah
*Attorney, Agent, or Firm*—Karen E. Klumas

[57] ABSTRACT

A process for producing an anisotropic melt-phase forming polymer involving separate acetylation and polymerization steps, which utilizes controlled vapor phase reflux to reduce reactant loss and assist in maintaining the stoichiometry of the process.

32 Claims, No Drawings

PROCESS FOR PRODUCING LIQUID CRYSTAL POLYMER

This is a continuation of No. 08/462,479, filed Jun. 5, 1995, now abandoned, which is continuation-in-part of application Ser. No. 08/317,961, filed on Oct. 4, 1994, now abandoned.

BACKGROUND OF THE INVENTION

1. Field of the Invention

This invention relates to a process for producing an anisotropic melt-phase forming polymer in which the production of undesirable degradation products is minimized; more particularly, this invention relates to a process for producing an anisotropic melt-phase forming polymer, involving separate acetylation and polymerization steps, which utilizes controlled vapor phase reflux to reduce reactant loss and maintain the stoichiometry of the process. In one embodiment, the process of this invention relates to the production of anisotropic melt-phase forming polymer having repeating units derived from (a) aromatic hydroxycarboxylic acid, (b) aromatic diol and/or aromatic hydroxyamine and (c) aromatic dicarboxylic acid. In another embodiment, the process of this invention relates to the production of anisotropic melt-phase forming polymer having repeating units derived from substituted or unsubstituted p-hydroxybenzoic acid and hydroxynaphthoic acid.

2. Description of the Prior Art

The preparation of aromatic melt-forming polymers having repeating units derived from (a) aromatic hydroxycarboxylic acid, (b) aromatic diol and/or aromatic hydroxyamine and (c) aromatic diacid are described, for example, in U.S. Pat. Nos. 4,473,682; 4,746,694; 4,522,974; 4,918,154; and 4,937,310. Frequently, the preparative techniques disclosed in connection with the preparation of such polymers utilize the ester derivatives of the aromatic hydroxy carboxylic acid and aromatic diol (and/or hydroxyaromatic amine) precursors and charge these esterified derivatives, together with the aromatic diacid to a reactor as solids which are subsequently heated to initiate the polycondensation reaction.

Alternatively, it is known to charge the aromatic hydroxycarboxylic acid, aromatic diol (and/or hydroxyaromatic amine) and aromatic diacid to a reactor together with acetic anhydride and a desired polycondensation catalyst, heat the reactor to initiate the acetylation of hydroxyl and amino groups of the reactants, remove acetic acid produced by the acetylation, raise the reactor temperature to initiate polycondensation, and allow the reaction to proceed to a desired polymer viscosity. Similarly, it is known to produce polymers having units derived from hydroxybenzoic acid and hydroxynaphthoic acid by charging the esterified derivatives of the aromatic hydroxy acid reactants to a reaction vessel, heating the reactants under vacuum to a temperature at which acetic acid is distilled from the vessel, and subsequently raising the reaction temperature while undergoing a staged pressure reduction, until a desired polymer viscosity is reached. See, for example, U.S. Pat. No. 4,161,470.

Monomer purity, material availability and economics are oftentimes factors which favor a process which starts with the diol and hydroxy-acid precursors of the ester derivatives. Maintaining stoichiometric balance oftentimes is more difficult when these precursors rather than their esterified derivatives are the starting reactants. Reaction stoichiometry can affect the properties of the polymer ultimately produced, including the molecular weight and melt viscosity thereof. The degree to which polymer properties are impacted generally depends on the extent of monomer imbalance. For certain end-use applications (e.g., fiber production), there is little tolerance for polymers produced by reactions in which there are even minor deviations from the calculated stoichiometry.

Additionally, the loss of reactants that occurs as the reaction is taken to elevated temperatures can contribute to conditions of stoichiometric imbalance. Anhydride and volatile acetate intermediate loss through distillation oftentimes contributes significantly to this imbalance. Utilizing excess amounts of certain reactants may remedy this problem to a greater or lesser degree. See, for example, U.S. Pat. No. 4,370,466 disclosing the use of excess diol. It will also be appreciated by those skilled in the art that there can be numerous competing reactions taking place during the synthesis of anisotropic melt-phase forming polymers, particularly since reaction conditions are themselves subject to change as the synthesis proceeds. In addition to the possible effect on stoichiometry in the context of acetylation/de-acetylation reactions, changes in reaction conditions can result in the formation of degradation products which, in excess amounts, can have a deleterious effect on the properties of the polymer ultimately produced.

Depending upon the particular polymer being synthesized, charging excess reactants can add significantly to process economics. Compensating for-distillation loss through the use of excess reactants may itself, in certain instances, contribute to stoichiometric imbalance. In theory, conducting both the acetylation and polycondensation portions of the reaction in a single reactor may minimize the potential for stoichiometric imbalance.

In single reactor systems, batch size and cycle time are factors which influence the rate of polymer production. In the above-described reactions, the amount of material polymerized utilizing a single reactor will generally be less than the reactor's capacity, given that the solid precursors occupy a greater volume than an acetylated melt. On a commercial scale, however, this can result in under-utilization of reactor capacity. Additionally, the use of a single reactor system does not, of itself, address the problem of distillate loss.

An object of this invention is to provide a process for producing an anisotropic melt-phase forming polymer which minimizes reactant loss and provides improved production efficiency without significantly detracting from the properties of the polymer ultimately produced.

These and other aspects of this invention are described in greater detail in the description and examples which follow.

SUMMARY OF THE INVENTION

In accordance with one embodiment of this invention, it has been found that certain aromatic hydroxy-carboxylic acids and aromatic diols (and/or hydroxyaromatic amines which, in the remainder of this specification and the claims which follow, are understood to be included within the term "aromatic diol") can be combined in a first reactor with an excess amount of acetic anhydride, heated to temperature at which acetylation is initiated without inducing polymerization or loss of the resulting acetates and, following the removal of acetic acid byproduct, transferred to a second reactor where the acetylated melt together with an aromatic dicarboxylic acid forms a reaction mixture which, in the presence of a polycondensation catalyst, is heated under specified conditions to produce a polymer capable of forming an anisotropic melt phase at a temperature below approximately 375° C. Thus, in one embodiment, this invention relates to a process for producing an anisotropic melt-forming polymer consisting essentially of repeating units of the formula:

(I)

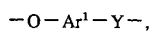
(II)

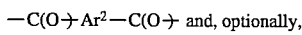
(III)

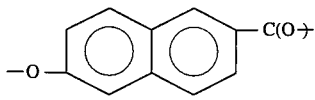
(IV)

wherein for each repeating unit represented by formula (II) Y is oxygen or nitrogen and wherein for each repeating unit represented by formula (II) or (III) $Ar^1$ and $Ar^2$ independently represent a divalent radical comprising at least one aromatic ring, which comprises the steps of:

(a) combining, in a first reactor equipped for controlled vapor phase reflux the p-hydroxybenzoic acid, aromatic diol, and 6-hydroxy-2-naphthoic acid reactants from which repeating units (I), (II) and, when present, (IV) are derived with an excess of from about 1 to about 10 mole percent of acetic anhydride, based on the total moles of reactive hydroxyl and, if present, amine groups present on said reactants, to form an acetylation mixture;

(b) heating the acetylation mixture to a temperature at which acetylation of the hydroxyl groups is initiated;

(c) maintaining the resulting acetates in a molten state for a period of time sufficient to substantially complete the acetylation reaction and remove substantially all acetic acid byproduct generated by the acetylation reaction without causing significant polymerization or loss of the acetates;

(d) introducing the molten acetates into a second reactor equipped for controlled vapor phase reflux and preheated to a temperature sufficient to maintain the acetates in the melt without causing significant polymerization;

(e) heating the melt, in the presence of a polycondensation catalyst and a stoichiometric amount of the aromatic dicarboxylic acid from which repeating unit (III) is derived to a temperature sufficient to induce polymerization at a rate which avoids sublimination of the acetates or the oligomeric products initially produced;

(f) maintaining the melt at polymerization temperature under vacuum for a period of time sufficient to produce a polymer of desired melt viscosity; and (g) discharging the resultant polymer from the second reactor.

In another embodiment, this invention relates to a process for producing an anisotropic melt-forming polymer consisting essentially of repeating units of the formula:

(I)

and

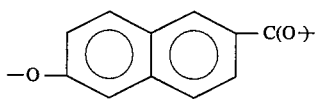
(IV)

which comprises the steps of:

(a) combining, in a first reactor equipped for controlled vapor phase reflux the p-hydroxybenzoic acid and 6-hydroxy-2-naphthoic acid reactants from which repeating units (I) and (IV) are derived with an excess of from about 1 to about 10 mole percent of acetic anhydride, based on the total moles of reactive hydroxyl groups present on said reactants, to form an acetylation mixture;

(b) heating the acetylation mixture to a temperature at which acetylation of the hydroxyl groups is initiated;

(c) maintaining the resulting acetates in a molten state for a period of time sufficient to substantially complete the acetylation reaction and remove substantially all acetic acid byproduct generated by the acetylation reaction without causing significant polymerization or loss of the acetates;

(d) introducing the molten acetates into a second reactor equipped for controlled vapor phase reflux and preheated to a temperature sufficient to maintain the acetates in the melt without causing significant polymerization;

(e) heating the melt, in the presence of a polycondensation catalyst, to a temperature sufficient to induce polymerization at a rate which avoids sublimination of the acetates or the oligomeric products initially produced;

(f) maintaining the melt at polymerization temperature under vacuum for a period of time sufficient to produce a polymer of desired melt viscosity; and (g) discharging the resultant polymer from the second reactor.

In the remainder of this specification, anisotropic melt-phase forming polymer derived from (a) aromatic hydroxycarboxylic acid, (b) aromatic diol and (c) aromatic dicarboxylic acid reactants is referred to as "Polymer A" and anisotropic melt-phase forming polymer derived from p-hydroxybenzoic acid and 6-hydroxy-2-naphthoic acid reactants is termed "Polymer B".

DETAILED DESCRIPTION OF THE INVENTION

Conducting the acetylation and polycondensation reactions in separate reactors provides a means of increasing system efficiency. By separating these steps, simultaneous acetylation and polymerization reactions can be conducted. This allows the esters of the aromatic diol (when present) and aromatic hydroxy-carboxylic acid components to be prepared at the same time that previously acetylated reactants are being polymerized, decreasing the overall cycle time for the reactions. Additionally, separating the polymerization from the acetylation potentially allows greater reactor capacity utilization during polycondensation, given that the acetylated melt occupies a smaller volume than the precursors from which the constituent monomers are derived.

In the process of this invention, the acetylation and polymerization reactions are conducted in separate reactors. Depending upon the size of the acetylation reactor, it may serve one or more polymerization units. In carrying out the acetylation, the hydroxy-aromatic carboxylic acid and, in the case of Polymer A, aromatic diol reactants are charged to a first reactor and, in the presence of acetic anhydride, heated to a temperature at which the reactant hydroxy and amine groups are esterified. In the case of Polymer A, the aromatic dicarboxylic acid is optionally charged to the first reactor together with the hydroxy-aromatic carboxylic acid and aromatic diol reactants.

Acetylation is generally initiated at temperatures of about 90° C. Acetic acid is a byproduct of the acetylation reaction. In the initial stage of the acetylation, reflux should be employed to maintain vapor phase temperature below the point at which acetic acid and anhydride begin to distill. To effect acetylation, the reaction mixture is heated, under reflux to between 90° and 150° C., preferably about 100° to about 130° C. In order to complete the acetylation, the reaction mixture is then heated to final melt temperature of about 150° to about 220° C., preferably about 150° to about 200° C. to remove byproduct acetic acid. At this point, vapor phase temperature should exceed the boiling point of acetic acid but remain low enough to retain residual acetic anhydride. In the practice of this invention the use of reaction temperatures of from about 180° to about 200° C. to complete the acetylation are of particular interest.

In order to ensure substantially complete reaction, it is desirable to utilize an excess amount of acetic anhydride in conducting the acetylation. The amount of excess anhydride utilized may vary depending upon the particular polymer being produced. Typically, it is recommended that, based on the total moles of reactant hydroxyl and, if present, amine groups present on the reactants from which repeating units (I), (II) and (IV) are derived that an excess of from about 1 to about 10 mole percent of acetic anhydride be utilized. Frequently, an excess of from about 1 to about 3 mole percent of acetic anhydride is utilized.

To obtain both complete acetylation and maintenance of stoichiometric balance, anhydride loss must be minimized. Acetic acid vaporizes at temperatures of about 118° C. At higher temperatures, i.e., about 140° C. acetic anhydride also begins to vaporize. In the practice of this invention, the acetylation reactor is equipped with a means of providing controlled vapor phase reflux. In an embodiment of particular interest, the acetylation reactor is furnished with a packed column or other reflux means which is connected to a condenser that, in turn, is connected with a distillate receiver. Providing the receiver with a means of pumping the cooled acetic acid back to the top of the reflux column offers a way to control the temperature of the vapor phase reflux, and minimizes acetic anhydride loss or loss of volatile monomer acetate intermediates. For purposes of this invention, holding vapor phase reflux temperature at about 120° to about 130° C. during completion of the acetylation is preferred.

The aromatic dicarboxylic acid utilized in the preparation of polymer A may exist as a solid or liquid under the above-described acetylation conditions. While the aromatic dicarboxylic acid may be added to the reaction in either the acetylation or polymerization steps, in the case of aromatic dicarboxylic acids which are not ordinarily soluble in the acetylated melt, e.g., terephthalic acid, it is generally desirable to add such materials to the reaction in the polymerization step. Adding insoluble aromatic dicarboxylic acids to the polymerization as opposed to the acetylation reaction, allows the melt to be filtered prior to transfer from the acetylation vessel. Additionally, this method of insoluble aromatic dicarboxylic acid addition minimizes the potential for diacid loss during melt transfer and clogging of the transfer line. When insoluble diacids are present in relatively small amounts, transfer loss and line clogging may be of less relevance.

After acetylation is complete, the acetylated melt is transferred to a second reactor where, in the case of Polymer A, if the aromatic dicarboxylic acid from which repeating unit (III) is derived has not been previously added, it will be combined with said aromatic dicarboxylic acid(s) and heated to initiate polymerization. To avoid undesirable side reactions, it is advisable to minimize the time the melt is held at elevated temperatures prior to polycondensation. It is, therefore, desirable to transfer the acetylated melt to a polycondensation reactor promptly after the acetylation reaction.

Temperatures at which the polymerization begins vary depending upon the polymer being produced. In general, such temperatures are within a range of from about 210° to about 260° C. Acetic acid is also a byproduct of the polymerization reaction. Like the acetylation reactor, the polymerization reactor should be equipped with a means of providing controlled vapor phase reflux. It has been found that in the absence of controlled vapor phase reflux, acetic anhydride, acetoxybenzoic and other volatile materials are vaporized from the polymerization reactor as the temperature of the polymerization reactor is increased. Depending on the particular polymer synthesized, it is preferable to maintain vapor phase reflux temperatures of about 120° to about 130° C. while the contents of the polymerization reactor are heated.

As one approaches the final reaction temperature, volatile byproducts of the reaction having boiling points above that of acetic acid and acetic anhydride must be removed. Accordingly, at reactor temperatures of about 300° to about 350° C., the reflux is generally adjusted to allow higher vapor phase temperatures or is discontinued.

Providing for controlled vapor phase reflux in the polycondensation reactor has been found to minimize the production of undesirable degradation products. At conventional polymerization temperatures, it has also been determined that acetoxybenzoic acid may react with acetic acid to produce acetic anhydride and hydroxybenzoic acid. Without wishing to be bound to theory, it is believed that providing for controlled vapor reflux returns acetic anhydride which might otherwise be lost by distillation and shifts the equilibrium toward the acetylation of hydroxybenzoic acid, thereby minimizing degradation of hydroxybenzoic acid to phenol and acetic acid. The presence of these degradation products can lead to a loss of properties in the polymer ultimately formed. Controlled vapor phase reflux also returns acetoxybenzoic acid to the reaction, reducing or eliminating the need to add excess hydroxybenzoic acid to the original acetylation charge. Additionally, controlled vapor phase reflux has been found to improve reaction kinetics compared to a system lacking same. The ability to reduce the amount of hydroxybenzoic acid utilized and increase the overall reaction kinetics can be of significant economic advantage.

Similar vapor-liquid equilibria are believed to occur with respect to the acetylated diols. Thus, in the case of Polymer A, returning anhydride to the polycondensation reaction assists in maintaining the stoichiometric balance between diol and diacid components of the system.

The polymerization reaction is generally conducted in the presence of a polycondensation catalyst. Suitable catalysts include dialkyl tin oxide (e.g., dibutyl tin oxide), diaryl tin oxide, titanium dioxide, alkoxy titanium silicates, titanium alkoxides, alkali and alkaline earth metal salts of carboxylic acids, gaseous acid catalysts such as Lewis acids (e.g., $BF_3$), hydrogen halides (e.g., HCL), and the like. The quantity of catalyst utilized is typically about 50 to about 500 parts per million, based on the total weight of the reactants from which the above-described repeating units are derived, excluding the acetic anhydride. For purposes of this invention, the use of from about 100 to about 300 parts per million by weight of one or more alkali metal-containing catalysts is of particular interest in the production of Polymer A. Sodium or potassium acetate are preferred catalysts for the production of both Polymer A and Polymer B. The catalyst may be introduced to the reaction in either the acetylation or polymerization steps.

In the multi-reactor system of the subject process, there is the added benefit of being able to tailor the individual reactors to the function of a particular reaction, i.e., acetylation which produces a relatively low viscosity melt or polycondensation which produces a higher viscosity polymer. To build molecular weight in the melt, the polymerization reactor may also be equipped with a vacuum, the application of which facilitates removal of volatiles formed during the final stage of the polycondensation. Optimally, the melt may be transferred to one or more finishing reactors specially designed to build molecular weight.

Following polymerization, the molten polymer is discharged from the reactor, typically through an extrusion orifice which may be fitted with a die of desired configuration. The extruded material is then solidified and collected. Commonly, the melt is discharged through a perforated die to form strands which are taken up in a water bath, pelletized and dried.

If desired, the molecular weight of the preformed polymer may be advanced by solid state polymerization or other post-polymerization treatments; however, by applying a vacuum in the final stages of polymerization as outlined above, it may be possible to reach a desired molecular weight without solid stating.

The melt-processable polymer formed by the present invention designated as Polymer A is a wholly aromatic polyester or poly(esteramide) which consists essentially of at least three different recurring units which, when combined in the polyester, have been found to form an optically anisotropic melt phase at a temperature below approximately 400° C. Polymer B is a melt-processable polyester consisting entirely of two different recurring units which also exhibit liquid crystalline properties in the melt. Because of its ability to exhibit optically anisotropic properties (i.e., liquid crystalline properties) in the melt, the polymers of this invention readily can form a product having a highly oriented molecular structure upon melt processing.

Unit (I) of the subject polymers (i.e., Polymer A and Polymer B) can be termed a 4-oxybenzoyl unit and possesses the structural formula:

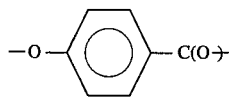

While not specifically illustrated in the structural formula, at least some of the hydrogen atoms present upon the aromatic ring of Unit (I) may be substituted. Included among the representative precursors from which recurring unit (I) may be derived are: 4-hydroxybenzoic acid; 3-chloro-4-hydroxybenzoic acid; 3-methyl-4-hydroxybenzoic acid; 3-methoxy-4-hydroxybenzoic acid; 3-phenyl-4-hydroxybenzoic acid; 3,5-dichloro-4-hydroxybenzoic acid; 3,5-dimethyl-4-hydroxybenzoic acid; 3,5-dimethoxybenzoic acid; and the like. In a preferred embodiment recurring unit (I) is 4-hydroxybenzoic acid.

Recurring unit (II) of the Polymer A includes one or more moieties of the formula:

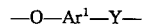

wherein $Ar^1$ is a divalent radical comprising at least one aromatic ring. Although not specifically shown in the formula given, recurring unit (II) includes derivatives in which at least some of the hydrogen atoms present upon the aromatic ring(s) thereof are substituted in a manner similar to that described for recurring units (I). Representative of the precursors from which recurring unit (II) may be derived are aromatic diols such as, for example, 4,4'-biphenol, hydroquinone, resorcinol, aminophenol, and the like.

Recurring unit (III) of Polymer A includes one or more dicarboxy aryl moieties of the formula:

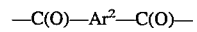

wherein $Ar^2$ is a divalent radical comprising at least one aromatic ring. Although not specifically shown in the formula given, recurring unit (III) includes derivatives in which at least some of the hydrogen atoms present upon the aromatic ring(s) thereof are substituted in a manner similar to that described for the recurring units previously described. Representative of the precursors from which recurring unit (III) may be derived are aromatic diacids such as, for example, terephthalic acid, isophthalic acid, naphthalene dicarboxylic acid, biphenyl dicarboxylic acid and the like.

Preferably, recurring units (II) and (III) are symmetrical in the sense that the divalent bonds which join these units to the other recurring units in the polymer are symmetrically disposed on one or more aromatic rings (e.g., are para to each other or diagonally disposed when present on a naphthalene ring).

Selection of a particular unit (III) will depend, in part, on the properties desired in the ultimate polymer. For example, moieties derived from terephthalic acid, and mixtures of terephthalic acid and isophthalic acid are of particular interest as recurring unit(s) (III).

Unit (IV) of the subject polymers (i.e., Polymer B and, optionally, Polymer A) can be termed a 6-oxy-2-naphthoyl unit and possesses the structural formula:

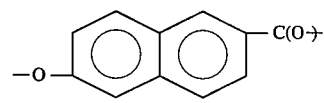

As in the case of recurring units (I), (II), and (III), at least some of the hydrogen atoms present upon the aromatic rings of recurring unit (IV) may be substituted. Such optional substitution may be an alkyl group of 1 to 4 carbon atoms, an alkoxy group of 1 to 4 carbon atoms, an alkoxy group of 1 to 4 carbon atoms, phenyl, halogen ( e.g., Cl, Br, I) and mixtures of the foregoing. Representative of the precursors from which recurring unit (IV) may be derived are aromatic hydroxy-carboxylic acids which include: 6-hydroxy-2-naphthoic acid; 6-hydroxy-5-chloro-2-naphthoic acid; 6-hydroxy-5-methyl-2-naphthoic acid; 6-hydroxy-5-methoxyl-2-naphthoic acid; 6-hydroxy-5-phenyl-2-naphthoic acid; 6-hydroxy-7-chloro-2-naphthoic acid; 6-hydroxyl-5,7- dichloro-2-naphthoic acid, and the like. The presence of ring substitution tends to modify, to some degree, the physical properties of the resulting polymer (e.g., the polymer may soften at a lower temperature, its impact strength may be improved, and the crystallinity of the solid polymer may be further decreased). In a preferred embodiment no ring substitution is present.

A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

The subject process is suitable for the production of a wide variety of polymers having the above-described recurring units. Selection of particular recurring units and their relative amounts will depend, in large part, on the properties required in the ultimate polymer. Commonly, Polymer A will contain from about 20 to about 80 mole percent of repeating unit (I), from about 40 to about 10 mole percent of repeating unit (II), from about 40 to about 10 mole percent of repeating unit (III), and from about 0 to about 20 mole percent of repeating unit (IV). While the relative amounts of a particular recurring unit are subject to variation, it will be appreciated by those skilled in the art that the total molar quantities of recurring units II and III present in the subject polymers will be substantially equal. Polymer B will commonly contain from about 20 to 80 mole percent of repeating unit I and from about 80 to about 20 mole percent of repeating unit IV. Minor amounts of other ester-forming moieties may be present in both Polymer A and Polymer B, provided that such moieties not adversely influence the thermotropic melt phase of the polymers heretofore described. In general, the various recurring units will be present in the resultant compositions in a random configuration.

The polymers formed by the process of this invention commonly exhibit a weight average molecular weight of about 5,000 to 200,000. Molecular weights of preference will depend, in large part, on the desired end-use application for which these polymers are intended. For example, for injection molding applications weight average molecular weights of from about 10,000 to about 40,000 are commonly of interest, whereas, for encapsulant applications lower weight average molecular weights, e.g., about 2,000 to about 5,000, are generally preferred. Molecular weight may be determined by standard techniques not involving the solution of the polymer, e.g., by end group determination via infra red spectroscopy on compression molded films.

The polymers exhibit an inherent viscosity (i.e., I.V.) of at least about 1.0 dl/g when dissolved in a concentration of 0.1 percent by weight in pentafluorophenol at 60° C. Commonly, the inherent viscosities of these polymers range from about 1.0 to about 8.0 dl/g for many injection molding applications, with viscosities of from about 1.0 to about 3.0 dl/g being more typical for encapsulant.

The polymers of the present invention can be considered crystalline in the sense that fibers melt extruded therefrom exhibit X-ray diffraction patterns, using Ni-filtered CuKα radiation and flat plate cameras, characteristic of polymeric crystalline materials. In spite of the crystallinity observed, the polymers produced by the process of the present invention may be easily melt processed, and are not intractable. Characteristic of the subject liquid crystalline polymers is the formation of an anisotropic melt phase in which are formed liquid crystals. Thus, in the melt there is a high tendency for the polymer chains to orient in the shear direction. Such thermotropic properties are manifest at a temperature which is amenable for melt processing to form shaped articles. Such anisotropy in the melt may be confirmed by conventional polarized light techniques whereby cross-polaroids are utilized. More specifically, the thermotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polaroids. The amount of light transmitted increases when the sample is sheared (i.e. is made to flow), however, the sample is optically anisotropic even in the static state.

The process of this invention is suitable for the production of a wide variety of polymers which can be melt processed to form a variety of shaped articles, e.g., molded three-dimensional articles, fibers, or films. Additionally, this process can be employed to produce lower molecular weight polymers suitable for encapsulant or coating applications.

EXAMPLES

The following examples are presented to further illustrate this invention. The examples are not, however, intended to limit the invention in any way. Unless otherwise indicated, all parts and percentages are by weight.

EXAMPLE 1

Part A—Two Reactor System

For this Example a 1700 liter oil heated reactor was utilized for the acetylation reaction and a 190 liter oil heated reactor was utilized for the polycondensation reaction. Both reactors were equipped with a helix-shaped agitator and a controlled means of refluxing acetic acid.

Each acetic acid reflux set-up utilized a vertical column (packed with Raschig rings) connected to a condenser which was attached to a distillate receiver in which was collected acetic acid from the acetylation or polycondensation reaction. The receivers were provided with a means of pumping acetic acid back to the vertical column. A thermocouple at the top of each column enabled the vapor temperature to be monitored so that, when needed, acetic acid could be sprayed into the top of the column, thereby controlling vapor phase temperature.

An oil heated transfer line connected the reactors through valves which could be manually opened and closed. The acetylation reactor was further equipped with a nitrogen source enabling the acetylated melt to be rapidly transferred to the polycondensation reactor. The polycondensation reactor was equipped with a vacuum pump to build molecular weight in the final stage of the polymerization.

With the transfer line valves in a closed position, the acetylation reactor, which was purged with nitrogen prior to charging, was charged with the following:

83.05 kg of 4-hydroxybenzoic acid, 33.56 kg of biphenol, 7.53 kg of 6-hydroxy-2-naphthoic acid, 107.60 kg of acetic anhydride, and 20.5 g of potassium acetate to form a reaction mixture.

The reaction mixture was brought to a temperature of 125° C. and, with stirring, held at that temperature for approximately 45 minutes. The temperature of the acetylation reactor was then brought to 190° C. and, with stirring, held at that temperature for 1 hour. Acetic acid byproduct was driven off and collected in the distillate receiver with the vapor phase temperature being held by reflux at 120° to 130° C. A nitrogen purge was maintained during the reaction. The transfer line valves were then opened and, under nitrogen pressure, the reaction mixture was transferred to the polycondensation reactor which contained 29.98 kg of terephthalic acid heated to 190° C. After the transfer was complete, the transfer lines were closed to prevent backflow of the melt.

The melt was held at 190° C. with stirring, for 15 minutes and then taken to a final temperature of 355° C. over a period of 190 minutes. Thereafter, vapor phase temperature was held by reflux at 120° to 130° C.; however, reflux was discontinued when a reaction temperature of 300° C. was reached. A vacuum was then applied and the polycondensation continued until a viscosity of 7.5 to 8.5 dl/g was reached. The formed polymer was discharged from the polycondensation reactor through a perforated die and the resulting molten strands were taken up in a water bath, cooled and pelletized. The process was repeated 4 times to provide an average yield of 85%.

Fiber samples produced from these pellets had good spinnability and desired physical properties.

Part B—Single Reactor System

The 190 liter oil heated reactor equipped as described above with a helix-shaped agitator and a controlled means of refluxing acetic acid was utilized for both the acetylation and polycondensation reaction. As only a single reactor was employed in this reaction, the reactor was further equipped with a vacuum pump. The reactor was purged with nitrogen and charged with the following:

55.34 kg of 4-hydroxybenzoic acid, 22.40 kg of biphenol, 5.04 kg of 6-hydroxy-2-naphthoic acid, 20.00 kg of terephthalic acid, 71.78 kg of acetic anhydride, and 13.7 g of potassium acetate to form a reaction mixture. The reaction mixture filled the reactor to capacity. The mixture was then heated to 125° C. and, with stirring, held at that temperature for approximately 45 minutes. The temperature of the reactor was then brought to 190° C. and, with stirring, held at that temperature for 1 hour. Acetic acid byproduct was driven off and collected in the distillate receiver The melt was held at 190° C., with stirring, for 15 minutes and then taken to a final temperature of 355° C. over a period of 190 minutes. The vapor phase reflux temperature was held at 120° to 130° C. until a temperature of 300° C. was reached. Reflux was then discontinued. A nitrogen purge was maintained during the reaction. A vacuum was then applied and the polycondensation continued until a viscosity of 7.5 to 8.5 dl/g was reached. The formed polymer was discharged from the reactor through a perforated die and the resulting molten strands were taken up in a water bath, cooled and pelletized.

Fiber samples produced from these pellets had good spinnability and desired physical properties.

EXAMPLE 2

Part A—Single Reactor System—Run 1

This series of Examples illustrates the advantages of controlled reflux in a single reactor system.

An oil-heated stainless steel reactor equipped with a nitrogen source, helix-shaped agitator, packed column (Raschig Rings), condenser, vacuum pump, distillate receiver and recycle pump configured to return a spray of distillate from the receiver to the packed column was used to produce a liquid crystal polymer.

The reactor was purged with nitrogen and then charged with the following:

2356 kg of 4-hydroxybenzoic acid, 1150 kg of 6-hydroxy-2-naphthoic acid, 2440 kg of acetic anhydride, and 230 grams of potassium acetate.

The reactor was then heated to 125° C. under nitrogen and held at that temperature for approximately 20 minutes to acetylate the monomers. The temperature of the reactor was then brought to 190° C. to distill byproduct acetic acid. Although equipped for controlled vapor phase reflux, reflux was not used to control the temperature of the distilling vapors or the rate of distillation. The reaction mixture was then heated to 325° C. over a period of approximately 180 minutes while maintaining a nitrogen purge. Once again reflux was not used to control the temperature of the distilling vapors or the rate of distillation. A vacuum was then applied and the polycondensation continued until a viscosity of 7–8 dl/g was obtained. The formed polymer was discharged from the reactor through a perforated die, and the resulting strands were cooled in a water bath and pelletized. Yield of polymer was about 93%. The melting point of the resulting polymer was 280°–282° C. Analysis of the byproduct acetic acid indicated that 55 kg of the 4-hydroxybenzoic acid originally charged were lost in the distillate as 4-acetoxybenzoic acid and 4-hydroxybenzoic acid ("Equivalent HBA Loss").

Runs 2 to 4

A series of liquid crystal polymers having the same formulation as in Run 1 was made following the procedure therein described except that, during the distillation of acetic acid, the temperature of the vapor phase reflux was held at 120° to 130° C. by pumping cool acetic acid from the receiver to the top of the packed column. Polymer was isolated in the same fashion in about 94% yield. The melting point of the polymer increased depending on the flow rate of the acetic acid back to the column indicating higher proportions of 4-hydroxybenzoic acid were being incorporated into the polymer chain. The distillate in Runs 2 to 4 was analyzed as in Run 1. Flow rate, melting point and distillate loss data for Runs 1 to 4 is provided in the Table below.

TABLE 1

|  | Flow Rate (gpm) | Polymer Tm, °C. | Equivalent HBA Loss (kg) |
|---|---|---|---|
| Run 1 | — | 282 | 55.34 |
| Run 2 | 3.5 | 285 | 9.98 |
| Run 3 | 4.5 | 286 | not analyzed |
| Run 4 | 7.0 | 288 | not analyzed |

Part B—Single Reactor System

The procedure of Part A, Run 4 was repeated, except that the amount of 4-hydroxybenzoic acid charged to the reactor was reduced to 2283 kg. The resultant polymer had a melting point of 282° C. and was obtained in about 95% yield. Using a flow rate of 7.0 gpm, Equivalent HBA Loss was 1 kg.

Part C—Two Reactor System—Reflux

This Example illustrates how reaction kinetics are improved when controlled vapor phase reflux is used in a process wherein the acetylation and polycondensation are conducted in separate reactors. This is demonstrated by comparing the time required under vacuum to achieve the desired molecular weight as measured by the torque required to maintain constant agitator speed.

For this Example a 1700 liter oil heated reactor was utilized for the acetylation reaction and a 190 liter oil heated reactor was utilized for the polycondensation reaction. Both reactors were equipped with a helix-shaped agitator and a controlled means of refluxing acetic acid.

Each acetic acid reflux set-up utilized a vertical column (packed with Raschig rings) connected to a condenser which was attached to a distillate receiver in which was collected acetic acid from the acetylation or polycondensation reaction. The receivers were provided with a means of pumping acetic acid back to the vertical column. A thermocouple at the top of each column enabled the vapor temperature to be monitored so that, when needed, acetic acid could be sprayed into the top of the column, thereby controlling vapor phase temperature.

An oil heated transfer line connected the reactors through valves which could be manually opened and closed. The acetylation reactor was further equipped with a nitrogen purge enabling the acetylated melt to be rapidly transferred to the polycondensation reactor. The polycondensation reactor was equipped with a vacuum pump to build molecular weight in the final stage of the polymerization.

With the transfer line valves in a closed position, the acetylation reactor, which was purged with nitrogen prior to charging, was charged with the following:

103 kg of 4-hydroxybenzoic acid, 52 kg of 6-hydroxy-2-naphthoic acid, 106 kg of acetic anhydride, and 10 g of potassium acetate to form a reaction mixture.

The reaction mixture was brought to a temperature of 125° C. and, with stirring, held at that temperature for approximately 45 minutes. The temperature of the acetylation reactor was then brought to 190° C. and, with stirring, held at that temperature for one hour. Acetic acid byproduct was driven off and collected in the distillate receiver. During distillation of acetic acid, the temperature of the vapor phase reflux was held at 120° to 130° C. A nitrogen purge was maintained during the reaction. The transfer line valves were then opened and, under nitrogen pressure, the reaction mixture was transferred to the polycondensation reactor which was preheated to 190° C. After the transfer was complete, the transfer lines were closed to prevent backflow of the melt.

The melt was held at 190° C., with stirring, for 15 minutes and then taken to a final temperature of 325° C. over a period of 220 minutes. The temperature of the vapor phase reflux was held at 120° to 130° C. until a temperature of 300° C. was reached; reflux was then discontinued. After reaching a final temperature of 325° C., a vacuum was applied, and the polycondensation continued until a viscosity of 6.5 to 7.5 dl/g was reached. The formed polymer was discharged from the polycondensation reactor through a perforated die and the resulting molten strands was repeated 4 more times.

The average time under vacuum for all 5 batches with reflux was 43 minutes.

Part D—Two Reactor System—No Reflux

A second set of five, two-stage polymerizations was performed identical to that above with the exception that reflux was not used. Otherwise, the procedures and recipe were the same.

The average time under vacuum for all 5 batches without reflux was 80 minutes.

What is claimed is:

1. A process for producing an anisotropic melt-forming polymer consisting essentially of repeating units of the formula:

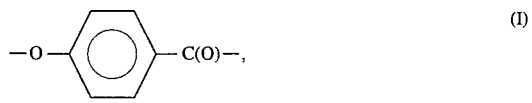

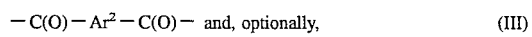

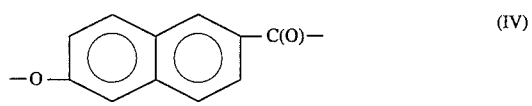

wherein for each repeating unit represented by formula (II) Y is oxygen or nitrogen and wherein for each repeating unit represented by formula (II) or (III) $Ar^1$ and $Ar^2$ independently represent a divalent radical comprising at least one aromatic ring, which comprises the steps of:

(a) combining, in a first reactor equipped for controlled vapor phase reflux the p-hydroxybenzoic acid, aromatic diol, and 6-hydroxy-2-naphthoic acid reactants from which repeating units (I), (II) and, when present, (IV) are derived with an excess of from about 1 to about 10 mole percent of acetic anhydride, based on the total moles of reactive hydroxyl and, if present, amine groups present on said reactants, to form an acetylation mixture;

(b) heating the acetylation mixture to a temperature at which acetylation of the hydroxyl groups is initiated;

(c) maintaining the resulting acetates in a molten state for a period of time sufficient to substantially complete the acetylation reaction and remove substantially all acetic acid byproducts generated by the acetylation reaction without causing significant polymerization or loss of the acetates;

(d) introducing the molten acetates into a second reactor equipped for controlled vapor phase reflux and preheated to a temperature sufficient to maintain the acetates in the melt without causing significant polymerization;

(e) heating the polymerization mixture, in the presence of a polycondensation catalyst and a stoichiometric amount of the aromatic dicarboxylic acid from which repeating unit (III) is derived, to a temperature sufficient to induce polymerization at a rate which avoids sublimation of the acetates or the oligomeric products initially produced;

(f) maintaining the melt at polymerization temperature under vacuum for a period of time sufficient to produce a polymer of desired melt viscosity; and (g) discharging the resultant polymer from the second reactor.

2. A process as described in claim 1 wherein in the first reactor, controlled reflux during the initial stage of the acetylation maintains vapor phase temperature below a temperature at which acetic acid and acetic anhydride begin to distill.

3. A process as described in claim 2 wherein controlled reflux during completion of the acetylation allows the vapor phase temperature to exceed the boiling point of acetic acid, but to remain low enough to retain residual acetic anhydride in the first reactor.

4. A process as described in claim 3 wherein vapor phase temperature during completion of the acetylation is held at about 120° to about 130° C.

5. A process as described in claim 4 wherein in the second reactor, vapor phase temperature is held at about 120° to about 130° C. by controlled reflux until a temperature of about 300° to 350° C. is reached.

6. A process as described in claim 5 wherein the final melt temperature of the molten acetates in the first reactor is from about 150° to about 220° C.

7. A process as described in claim 1 wherein discharged polymer has an inherent viscosity (I.V.) of at least about 1.0 dl/g at 60° C. in pentafluorophenol at a concentration of 0.1 wt %.

8. A process as described in claim 1 wherein an excess of from about 1 to about 3 mole percent of acetic anhydride is utilized.

9. A process as described in claim 4 wherein the molten acetates are filtered to remove any solid impurities present prior to their combination with the aromatic diacid precursor of recurring unit (III).

10. A process as described in claim 5 wherein after reaching a temperature of about 300° to about 350° C. the vapor phase temperature of the second reactor is allowed to increase to remove volatile byproducts.

11. A process as described in claim 5 wherein the polycondensation catalyst is at least one compound selected from the group consisting of alkali and alkaline earth metal salts of carboxylic acids.

12. A process as described in claim 11 which contains from about 50 to about 500 parts per million of catalyst, based on the total weight of the reactants from which the above-described repeating units are derived, excluding the acetic anhydride.

13. A process as described in claim 11 wherein the catalyst is potassium acetate and is present in amount of from about 100 to about 300 parts per million by weight, based on the total weight of the reactants from which the above-described repeating units are derived, excluding the acetic anhydride.

14. A process as described in claim 10 wherein the catalyst is present in the first reactor.

15. A process as described in claim 5 wherein the final melt temperature of the molten acetates is from about 180° to about 200° C.

16. A process as described in claim 5 wherein said anisotropic melt-forming polymer consists essentially of from about 20 to about 80 mole percent of repeating unit (I), from about 40 to about 10 mole percent of repeating unit (II), from about 40 to about 10 mole percent of repeating unit (III), and from about 0 to about 20 mole percent or repeating unit (IV), which when present replaces an equivalent amount of repeating unit (I).

17. A process as described in claim 16 wherein Y is oxygen; Ar¹ is selected from the group consisting of

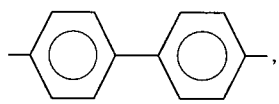,

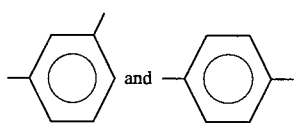

and mixtures thereof; and Ar² is selected from the group consisting of

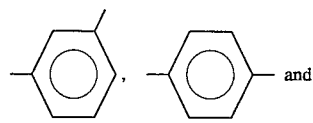 and

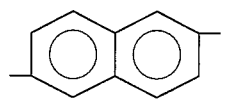

and mixtures thereof.

18. A process as described in claim 17 wherein Ar¹ is

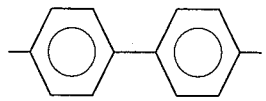

and Ar² is

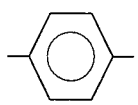

19. A process as described in claim 18 wherein Ar¹ is

and Ar² is a mixture of

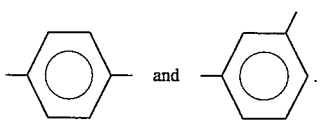

20. A process for producing an anisotropic melt-forming polymer consisting essentially of repeating units of the formula:

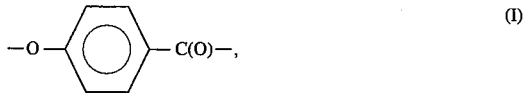 (I)

$O-Ar^1-Y$, (II)

 (III)

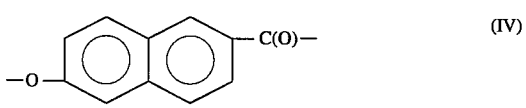 (IV)

wherein for each repeating unit represented by formula (II) Y is oxygen or nitrogen and wherein for each repeating unit represented by formula (II) or (III) Ar¹ and Ar² independently represent a divalent radical comprising at least one aromatic ring, which comprises the steps of:

(a) combining, in a first reactor equipped for controlled vapor phase reflux the p-hydroxybenzoic acid, aromatic diol, and 6-hydroxy-2-naphthoic acid reactants from which repeating units (I), (II) and, when present, (IV) are derived with an excess of from about 1 to about 10 mole percent of acetic anhydride, based on the total moles of reactive hydroxyl and, if present, amine groups present on said reactants, to form an acetylation mixture;

(b) heating the acetylation mixture to a temperature at which acetylation of the hydroxyl groups is initiated;

(c) maintaining the resulting acetates in a molten state for a period of time sufficient to substantially complete the acetylation reaction and remove substantially all acetic acid byproducts generated by the acetylation reaction without causing significant polymerization or loss of the acetates;

(d) introducing the molten acetates into a second reactor equipped for controlled vapor phase reflux and preheated to a temperature sufficient to maintain the acetates in the melt without causing significant polymerization, into which is also introduced a stoichiometric amount of the aromatic dicarboxylic acid from which repeating unit (III) is derived, to produce a polymerization mixture;

(e) heating the polymerization mixture, in the presence of a polycondensation catalyst to a temperature sufficient to induce polymerization at a rate which avoids sublimation of the acetates or the oligomeric products initially produced;

(f) maintaining the polymerization mixture at polymerization temperature under vacuum for a period of time sufficient to produce a polymer of desired melt viscosity; and (g) discharging the resultant polymer from the second reactor.

21. A process for producing an anisotropic melt-forming polymer consisting essentially of repeating units of the formula:

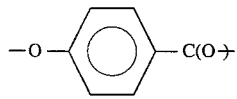

and

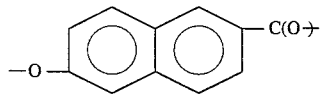

which comprises the steps of:

(a) combining, in a first reactor equipped for controlled vapor phase reflux the p-hydroxybenzoic acid and 6-hydroxy-2-naphthoic acid reactants from which repeating units (I) and (IV) are derived with an excess of from about 1 to about 10 mole percent of acetic anhydride, based on the total moles of reactive hydroxyl groups present on said reactants, to form an acetylation mixture;

(b) heating the acetylation mixture to a temperature at which acetylation of the hydroxyl groups is initiated;

(c) maintaining the resulting acetates in a molten state for a period of time sufficient to substantially complete the acetylation reaction and remove substantially all acetic acid byproduct generated by the acetylation reaction without causing significant polymerization or loss of the acetates;

(d) introducing the molten acetates into a second reactor equipped for controlled vapor phase reflux and preheated to a temperature sufficient to maintain the acetates in the melt without causing significant polymerization;

(e) heating the melt, in the presence of a polycondensation catalyst, to a temperature sufficient to induce polymerization at a rate which avoids sublimination of the acetates or the oligomeric products initially produced;

(f) maintaining the melt at polymerization temperature under vacuum for a period of time sufficient to produce a polymer of desired melt viscosity; and (g) discharging the resultant polymer from the second reactor.

22. A process as described in claim 21 wherein said anisotropic melt-forming polymer consists essentially of from about 20 to about 80 mole percent of repeating unit 1 and from about 80 to about 20 mole percent of repeating unit IV.

23. A process as described in claim 22 wherein the polycondensation catalyst is at least one compound selected from the group consisting of alkali and alkaline earth metal salts of carboxylic acids.

24. A process as described in claim 23 which contains from about 50 to about 500 parts per million of catalyst, based on the total weight of the reactants from which the above-described repeating units are derived, excluding the acetic anhydride.

25. A process as described in claim 20 wherein in the first reactor, controlled reflux during the initial stage of the acetylation maintains vapor phase temperature below a temperature at which acetic acid and acetic anhydride begin to distill.

26. A process as described in claim 25 wherein controlled reflux during completion of the acetylation allows the vapor phase temperature to exceed the boiling point of acetic acid, but to remain low enough to retain residual acetic anhydride in the first reactor.

27. A process as described in claim 26 wherein vapor phase temperature during completion of the acetylation is held at about 120° to about 130° C.

28. A process as described in claim 27 wherein in the second reactor, vapor phase temperature is held at about 120° to about 130° C. by controlled reflux until a temperature of about 300° to 350° C. is reached.

29. A process as described in claim 21 wherein in the first reactor, controlled reflux during the initial stage of the acetylation maintains vapor phase temperature below a temperature at which acetic acid and acetic anhydride begin to distill.

30. A process as described in claim 29 wherein controlled reflux during completion of the acetylation allows the vapor phase temperature to exceed the boiling point of acetic acid, but to remain low enough to retain residual acetic anhydride in the first reactor.

31. A process as described in claim 30 wherein vapor phase temperature during completion of the acetylation is held at about 120° to about 130° C.

32. A process as described in claim 31 wherein in the second reactor, vapor phase temperature is held at about 120° to about 130° C. by controlled reflux until a temperature of about 300° to 350° C. is reached.

* * * * *